United States Patent [19]

Gartside et al.

[11] Patent Number: 5,340,545
[45] Date of Patent: Aug. 23, 1994

[54] PARTICULATE SOLIDS CRACKING APPARATUS

[75] Inventors: Robert J. Gartside, Wellesley; Richard C. Norton, Boston, both of Mass.

[73] Assignee: Stone & Webster Engineering Corp., Boston, Mass.

[21] Appl. No.: 16,060

[22] Filed: Feb. 10, 1993

Related U.S. Application Data

[60] Continuation of Ser. No. 798,627, Nov. 26, 1991, which is a continuation of Ser. No. 362,028, Jun. 6, 1989, Pat. No. 5,098,672, which is a division of Ser. No. 243,462, Sep. 12, 1988, Pat. No. 4,919,898, which is a division of Ser. No. 84,328, Aug. 11, 1987, Pat. No. 4,814,067.

[51] Int. Cl.⁵ .............................. F27B 15/16; B01J 8/20
[52] U.S. Cl. ........................... 422/146; 208/48 Q; 422/147
[58] Field of Search ................... 422/144–147; 208/48 Q, 150, 113, 153, 159, 163

[56] References Cited

U.S. PATENT DOCUMENTS

| | | | |
|---|---|---|---|
| 2,906,695 | 9/1959 | Boston | 208/127 |
| 3,238,271 | 3/1966 | Nonnemacher et al. | 260/683 |
| 3,663,645 | 5/1972 | Dorn et al. | 260/683 |
| 3,676,519 | 7/1972 | Dorn et al. | 260/683 |
| 4,288,235 | 9/1981 | Gartside et al. | 55/196 |
| 4,404,095 | 9/1983 | Haddad et al. | 208/161 |
| 4,433,984 | 2/1984 | Gartside et al. | 55/196 |
| 4,495,060 | 1/1985 | Abrams | 208/48 |
| 4,764,268 | 8/1988 | Lane | 208/113 |
| 4,902,407 | 2/1990 | Chan et al. | 208/152 |
| 5,087,427 | 2/1992 | Quinn et al. | 422/144 |

Primary Examiner—Amalia L. Santiago
Attorney, Agent, or Firm—Hedman, Gibson & Costigan

[57] ABSTRACT

A catalytic cracking unit is disclosed which provides for quenching of a riser reactor effluent downstream of a rough cut separator and upstream of a cyclone separator.

1 Claim, 4 Drawing Sheets

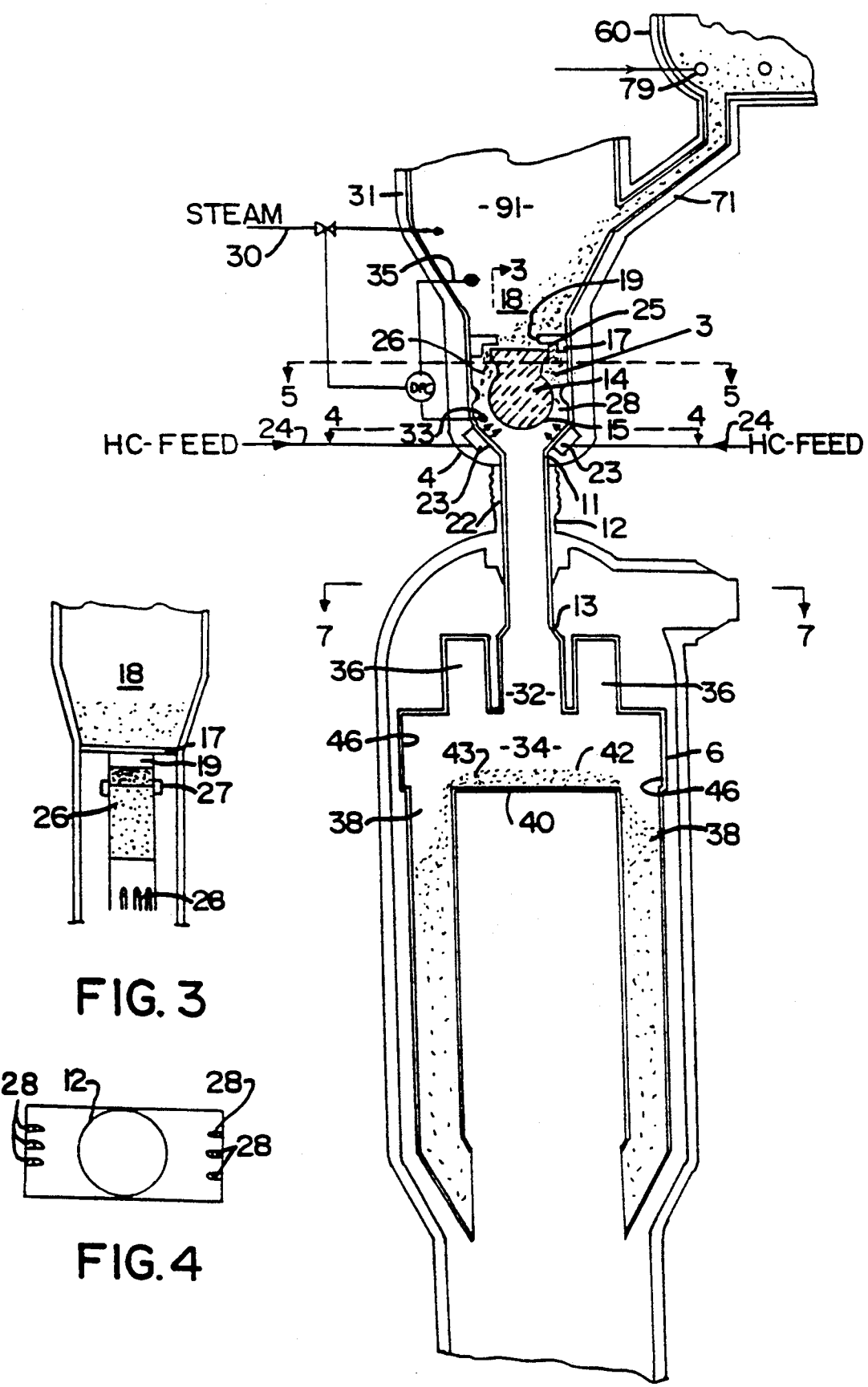

PARTICULATE SOLIDS CRACKING APPARATUS

This is a continuation of application Ser. No. 07/798,627, filed Nov. 26, 1991, which is a continuation of application Ser. No. 07/362,028 filed Jun. 6, 1989 now U.S. Pat. No. 5,098,672, which is a divisional of application Ser. No. 07/243,462 filed Sep. 12, 1988, now U.S. Pat. No. 4,919,898, which is a divisional application of Ser. No. 07/084,328, filed Aug. 11, 1987, now U.S. Pat. No. 4,814,067.

FIELD OF THE INVENTION

This invention relates to the production of useful hydrocarbon from hydrocarbon feed. More particularly, the invention relates to a process and apparatus for cracking hydrocarbon feed by the use of heated solids.

BACKGROUND OF THE INVENTION

Conversion of hydrocarbon feed to useful products such as fuel, olefins, etc., is now well known. Many processes have been developed to crack crude hydrocarbon to produce useful products. Among the conventional processes are pyrolysis cracking and catalytic cracking processes. In recent years, both pyrolysis cracking and catalytic cracking have implemented systems in which particulate solids are used as the heat source to promote cracking of the hydrocarbon feed.

In effect, particulate solids, either inert or catalytic, are heated and introduced into a cracking zone with hydrocarbon feed. The hydrocarbon feed is cracked in the cracking zone and the heated particulate solids lose heat and are fouled or contaminated with the tars and other heavy components of the hydrocarbon feed. Thereafter, typically the contaminated solids are regenerated for re-use in cracking hydrocarbon feed. Regeneration entails burning the contaminants from the solids and elevating the temperature of the particulate solids to the level necessary to crack the hydrocarbon feed.

Each cracking process in which particulate solids are used requires delivery and separation means to both engage the solids with the hydrocarbon feed and to separate the solids from the cracked product gases produced in the process.

Recently, a process and an apparatus have been developed by Stone and Webster Engineering Corporation that efficiently and effectively separates particulate solids from the cracked gases leaving a cracking reactor. U.S. Pat. No. 4,433,984 and others describe the separation process and apparatus that has minimized the contact time in separation of the particulate solids and cracked gases while achieving separation to a level desired for terminating cracking reactions.

Similarly, Stone and Webster Engineering Corporation has developed a process and an apparatus for delivering particulate solids to a service such as a fluidized bed furnace which eliminates moving mechanical parts and thereby enhances the function and reliability of the delivery system. The process and apparatus are described in U.S. Pat. No. 4,459,071. Essentially, the system relies on regulated pressure differentials to promote or interrupt the flow of solids to a location.

In addition, Stone and Webster Engineering Corporation has developed a process and apparatus for injecting hydrocarbon feed into a moving path of hot particulate solids to achieve rapid and complete cracking of the hydrocarbon feed. U.S. Pat. No. 4,338,187 and others describe a hydrocarbon feed and hot particulate solids feed system that achieves rapid mixing of the feed and solids and the desired attendant rapid cracking.

SUMMARY OF THE INVENTION

It is an object of the present invention to provide a process and apparatus that will facilitate complete and rapid cracking of hydrocarbon feed followed by rapid separation of the cracked gases from the particulate solids.

It is also an object of the present invention to provide a process and apparatus for rapidly separating cracked effluent from particulate solids and terminating the reactions in the cracked effluent by immediate quench.

It is another object of the present invention to provide a process and apparatus that affords controlled positive and reliable delivery of particulate solids to service locations such as the cracking reactor.

It is a further object of the present invention to provide a process and apparatus for effectively and efficiently regenerating particulate solids.

Another object of the present invention is the provision of a process and apparatus that achieves essentially complete separation of flue gases from the regenerated particulate solids.

It is also an object of the present invention to provide a process and apparatus that will enable hydrocarbon feed to be cracked with heat carried by regenerated particulate solids; and thereafter, facilitate separation of the particulate solids from the cracked effluent; and regenerate the solids for re-use as the heat source for a cracking reactor.

Thus, there is provided an apparatus comprising a reactor system, a regeneration assembly and a solids delivery assembly. The reactor system comprises of an essentially rectangular mixing zone; a tubular reaction vessel connecting the mixing zone to a separation means; a separation means to rapidly separate the cracked effluent from the particulate solids; cracked effluent quench apparatus immediately downstream of the separation means; and a final separation means. The regeneration assembly includes a stripper, an entrained bed heater and a flue gas-regenerated solids separation vessel. The solids delivery system includes a standpipe and an upper hopper.

The process proceeds by delivering a curtain of hot particulate solids through discrete essentially rectangular inlets to the mixing zone of the reactor at a controlled rate and simultaneously contacting the hydrocarbon feed with the solids curtain. After a short residence time in the reactor, the cracked effluent is separated from the hot solids, quenched and sent to conventional recovery equipment for product collection.

The particulate solids discharged from the reactor are at a reduced temperature from the temperature at which the solids entered the reactor and have become fouled with contaminants such as tar and coke from the hydrocarbon feed. The particulate solids are first stripped of some of the impurities and then heated in the entrained bed heater by combusting fuel and air with the coke contaminants on the solids.

The combustion gases generated in the entrained bed heater and regenerated solids travel upwardly to the regenerated solids separation vessel wherein the combustion gases are separated from the regenerated solids and exhausted as flue gases.

The regenerated particulate solids are collected in a slumped bed above the standpipe which terminates in a reactor hopper that is in direct communication with the rectangular solids entry to the reactor.

BRIEF DESCRIPTION OF THE DRAWINGS

The invention will be better understood when considered with the following drawings wherein:

FIG. 2 is an enlarged sectional elevational view of the reactor and cracked gas-solids separator of the present invention;

FIG. 3 is a sectional elevational view through line 3—3 of FIG. 2;

FIG. 4 is a plan view through line 4—4 of FIG. 2.

DESCRIPTION OF THE PREFERRED EMBODIMENT

The process and apparatus of the present invention have application in the various cracking environments, in which solids are used whether the solids be inert or catalytic. However, the process and apparatus of the present invention will be described with reference to a catalytic cracking process for producing olefins from hydrocarbon feed.

Figure 1:
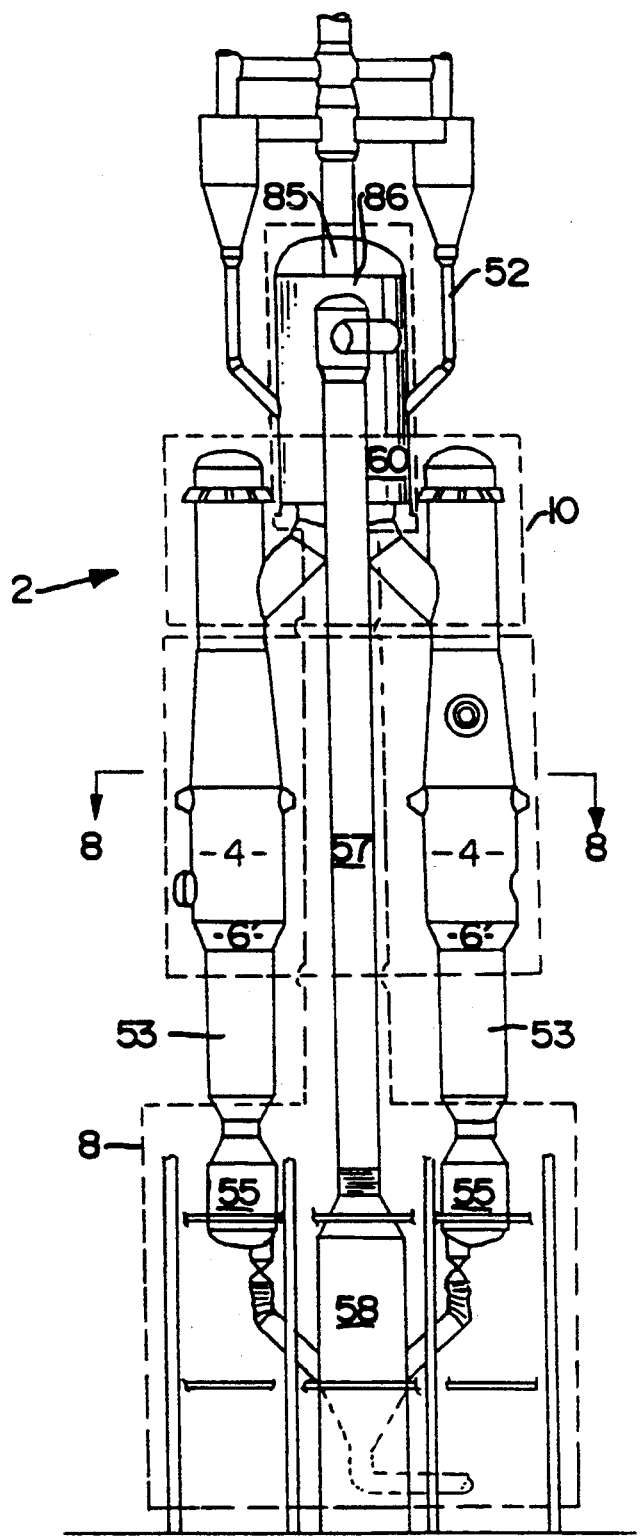
FIG. 1 is an elevational view of the overall system of the present invention.

As best seen in FIG. 1, the system 2 is comprised essentially of reactor system 4, a solids regeneration assembly 8 and a solids delivery system 10.

Figure 7:
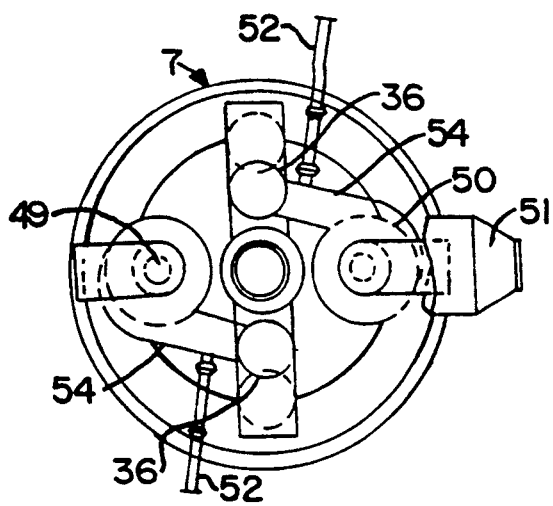
FIG. 7 is a sectional plan view through line 7—7 of FIG. 2.
Figure 8:
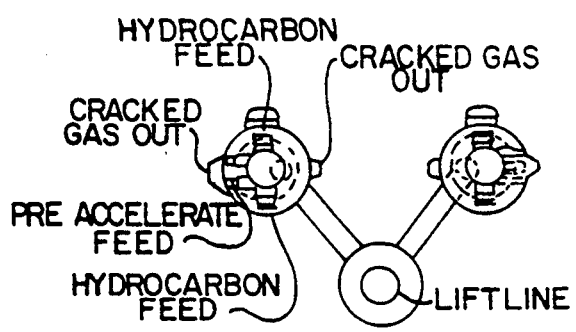
FIG. 8 is a sectional view through line 8—8 of FIG. 1.

The reactor system 4, best seen in FIG. 2, includes of a convergent mixing section 11, an elongated reaction section 12, a divergent section 13 downstream of the elongated reaction section 12, a separation system 6' and quench system 7 (Shown in FIG. 7). The mixing sections 11 are formed with a plug section 14 shown in cross-section as having an arcuate lower surface 15. A horizontally disposed plate 17 is arranged over the plug section 14 in spaced-relationship with the plug section 14 to form solids inlet passages 19 to the interior of the mixing section 11. The solids inlet passages 19 are configured in cross-section with a right angle turn and terminate in rectangular openings 25 through which the particulate solids enter the mixing section 11, in the form of a curtain of solids 26 as best seen in FIG. 3. The horizontal openings 25 are directly above each hydrocarbon feed inlet. Venturi configured passages 3 extend from the solids inlet passages 19 to the hydrocarbon feed inlets 28.

Figure 5:
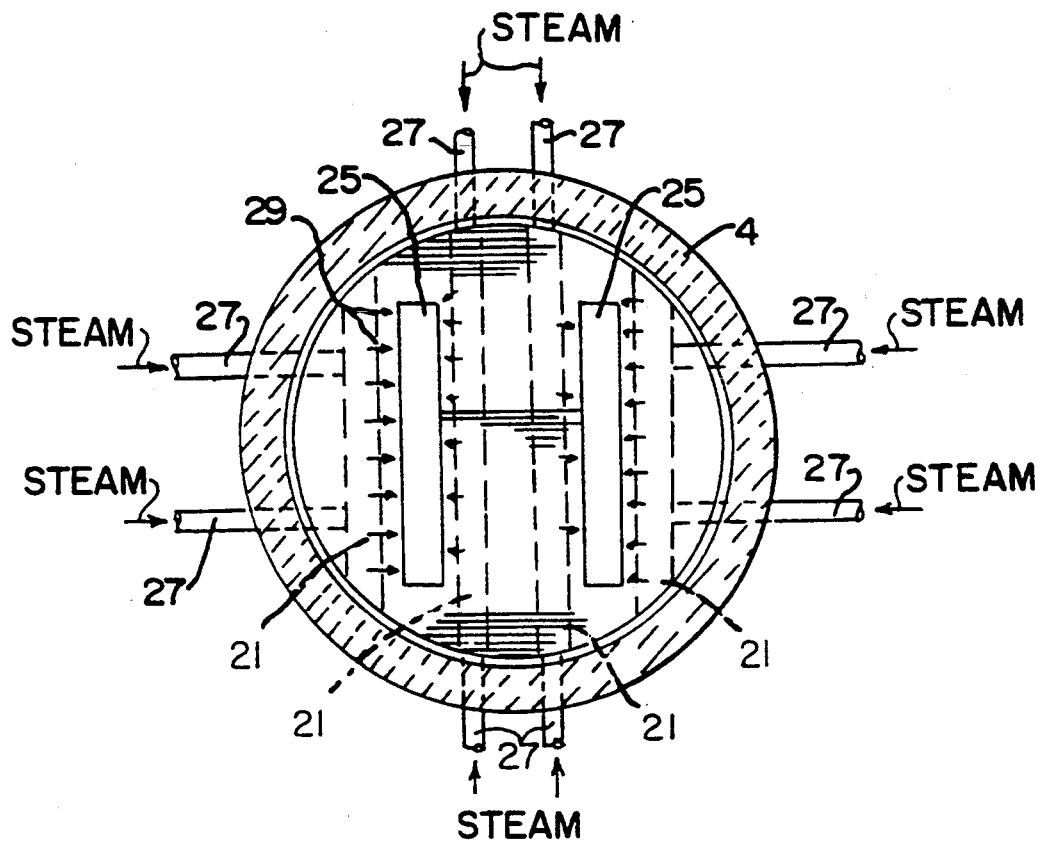
FIG. 5 is a sectional plan view through line 5—5 of FIG. 2.
Figure 6:
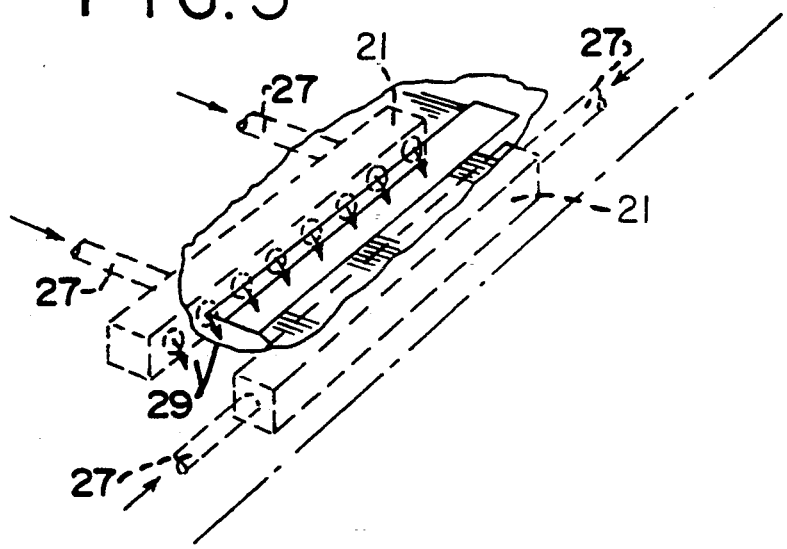
FIG. 6 is a partial view of the solids inlet to the reactor shown in FIG. 5.

Steam plenums 21, best seen in FIGS. 5 and 6, are arranged along each longitudinal edge of the horizontal opening 25 to deliver pre-acceleration gas (steam) through nozzles 29 into the curtain of solids 26 passing through the horizontal openings 25. A gas delivery line 27 is provided to deliver gas, usually steam or light hydrocarbon, under pressure to the nozzles 29. The nozzles 29 are arranged at a downward angle of 45° to the horizontal. The pre-acceleration gas is delivered to the plenums 21 at pressures of 3 to 5 psi above the pressure in the reactor and discharges through the nozzles 29 at that same relative pressure at a velocity of about 150 feet per second. The pre-acceleration gas accelerates the flow of solids through the horizontal openings 25 from a nominal three to six feet per second to approximately 50 feet per second for the mix of solids and pre-acceleration gas.

The hydrocarbon feed inlets 28 are located on the reactor wall 22 arranged either normal to the solids curtain 26 or at an angle upwardly of 30° into the solids curtain 26. The hydrocarbon feed is delivered to a manifold 23 through a line 24. The feed inlet nozzles 28 are fed with hydrocarbon from the manifold 23. As seen in FIG. 2, the feed inlet nozzles 28 are diametrically opposed from each other in the same horizontal plane. The mixing zone 11 of the reactor is rectangular as seen in FIG. 4 with the configuration making a transition to a tubular reactor at the elongated reaction section 12.

The feedstock entering the mixing zone 11 through nozzles 28 immediately impinge the solids curtains 26 and the desired mixing of feed and hot particulate solids occurs. With the opposing set of nozzles 28, the opposing feed jets and entrained solids from the solids curtain 26 will be directed by the arcuate contour 15 of the plug section 14 and impact with each other at approximately the vertical centerline of the mixing zone 11. When a gas-liquid mixed phase hydrocarbon is fed through the nozzles 28, the nozzles 28 are arranged at an angle normal or 90° to the solids curtain 26. When the hydrocarbon feed is a gas, the nozzles 28 are arranged at an upwardly directed angle of 30° into the solids curtain. The quantity of solids entering the mixing zone 11 of the reaction system through the horizontal inlets 19 is controlled in large part by the pressure differential between the mixing zone 11 of the reaction system and the chamber 91 above the solids reservoir 18 in a solids control hopper 31 directly above the horizontal inlets 19. Pressure probes 33 and 35 are located respectively in the mixing zone 11 of the reaction system and the control hopper chamber 91 to measure the pressure differential. Gas (steam) under pressure is delivered through a line 30 to the control hopper chamber 91 to regulate the pressure differential between the mixing zone 11 of the reaction system and the control hopper chamber 91 to promote or interrupt flow of the solids from the solids control hopper 31 to the mixing zone 11 of the reaction system. A detailed description of the process of regulating the solids flow is found in U.S. Pat. Nos. 4,459,071 and 4,453,865 that are incorporated herein by reference.

The hydrocarbon feed enters the mixing zone 11 of the reaction system at a temperature of 200° to 1100° F. and is elevated to a cracking temperature of 1000° to 1500° F. Cracking proceeds through the mixing zone 11 and elongated cracking zone 12. Thereafter, the combined cracked effluent and entrained particulate solids discharge to the separation system 6'. The residence time from hydrocarbon entry into the reaction system to entry into the separation system 6' of the reaction system is 0.05 to 0.5 seconds. This time represents the time of intimate contact between catalyst and hydrocarbon.

As best seen in FIG. 2, the separation system 6' includes a separator 6 comprising a mixed phase inlet 32, a horizontal chamber section 34, a plurality of cracked gas outlets 36 and particulate solids outlets 38. The separator 6 is an improvement on the solids-gas separator described in U.S. Pat. No. 4,433,984, the subject matter of which is incorporated herein by reference. The basic principles relating to relative diameters (Di, Dog, Dos), chamber height (H) and length (L) recited in U.S. Pat. No. 4,433,984 again obtain. However, the separator 6 is arranged in combination with the elongated cracking zone 12 and divergent section 13 of the reaction system. The divergent section 13 of the reaction system terminates in the separator mixed phase inlet 32 which is centrally disposed at the top of the horizontal section 34. As a result of the configuration of the composite reaction system including the separator 6, a solids bed 42 develops on the floor 40 of the horizontal section 34 with the cross-sectional profile 43 of the bed 42 forming a curvilinear arc over which the mixed phase gas and solids travel. The expansion of solids and cracked gas in the divergent section 13 enhances heat transfer and limits the velocity of the solids-gas mixture entering the separator 6.

The solids are sent to the lateral ends 46 of the horizontal section 34 and discharge downwardly through the solids outlets 38. The cracked gases follow a 180° path and after separation from the solids, discharge through gas outlets 36 that are located on the top of the horizontal section 34 intermediate the lateral ends 46. The plurality of solids outlets 38 and gas outlets 36 provide simultaneously for both minimum time in the separation zone and maximum solids-gas separation.

The separation system 6' also includes a conventional cyclone separator 50 directly downstream of each gas outlet 36, best seen in FIG. 7. The entry line 54 to each cyclone separator 50 is arranged at an angle of 90° to the gas outlet 36 with the cyclone separators 50 vertically disposed in the system. The cyclone separators 50 serve to collect the remaining entrained particulate solids from the cracked gas discharged from the separator 6. A dipleg line 49, returns the particulate solids to the regeneration assembly 8 and the cracked gas is sent for downstream processing through the gas outlet 51.

In practice, the separator 6 separates 95 to 99% of the solids from a gas solids mixtures having dust loadings of 0.2 to 0.3 pounds of solid per cubic foot of gas where the average particle size of the solids is 90 microns.

Each cyclone entry line 54 extending from the cracked gas outlet 36 to the cyclone 50 is provided with a direct quench line 52 at each cyclone entry line 54. Quench oil, usually the 100–400° F. cut from a downstream distillation tower is introduced into the cyclone 50 through the direct quench line 52 to terminate the reactions of the cracked gas. 0.1 to 0.3 gallons of quench oil are introduced upstream of the cyclone 50 for every pound of cracked gas.

In practice, it has been found that the cracking time; i.e. effective kinetic residence time is the time that elapses from the introduction of feed into the reaction system until the termination of cracked gas reactions in the cyclone 50. The effective kinetic residence time includes the time during which the hydrocarbon and catalyst are in intimate contact and the time from separation until quench. This effective kinetic residence time is 0.1 to 0.6 seconds.

Figure 9:
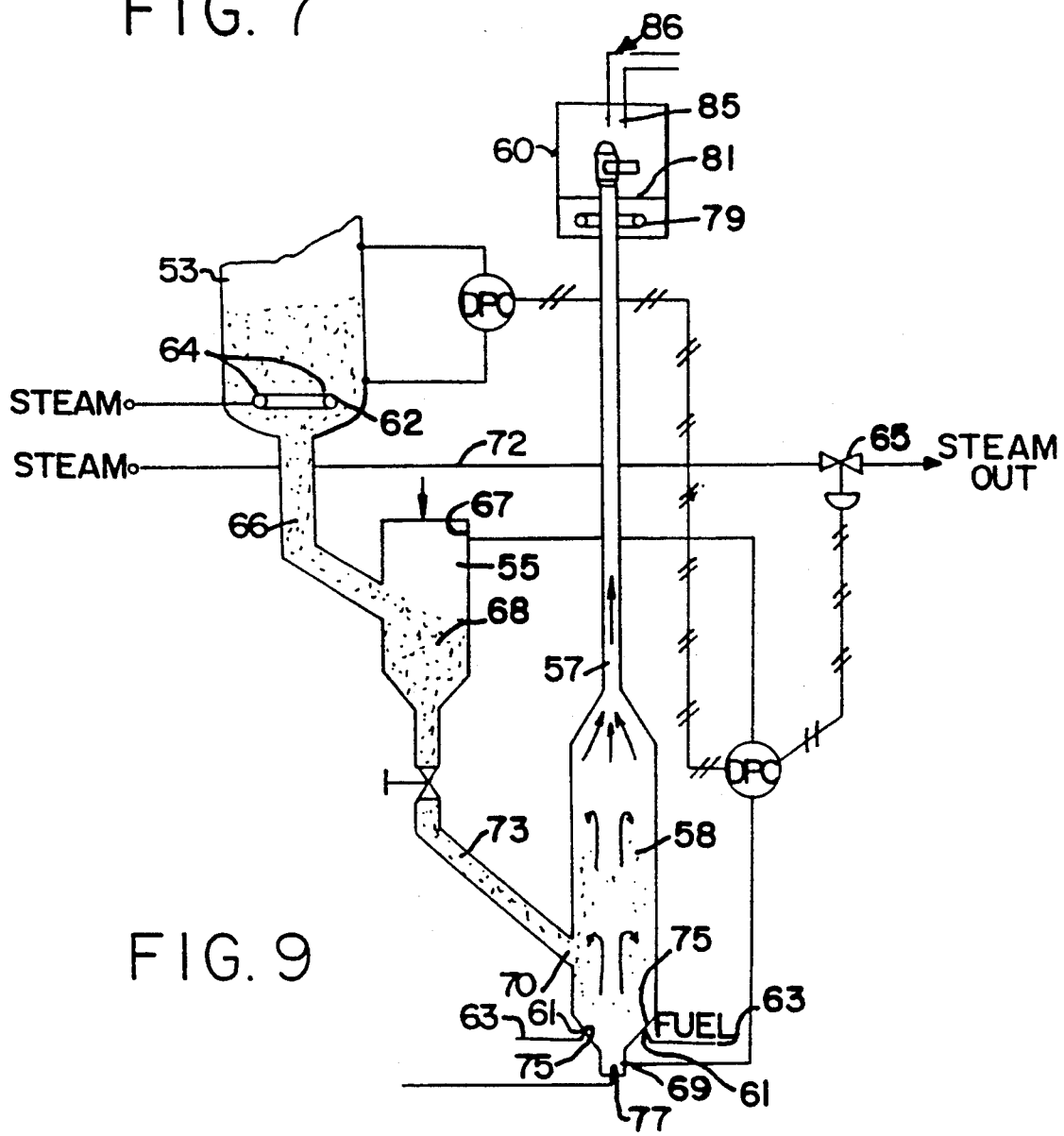
FIG. 9 is a schematic elevational view of the solids regeneration assembly.

As best seen in FIG. 9, the regeneration assembly 8 is comprised of a stripper 53, control hopper 55, entrained bed heater 58, a lift line 57, and a regenerated solids vessel 60.

The stripper 53 is a tubular vessel into which the particulate solids from the separator 6 are delivered through solids outlet legs extending from the separator solids outlets 38 and from the cyclone diplegs 49. A ring 62 best seen in FIG. 9, having nozzle openings 64 is provided at the bottom of the stripper 53. A stripping gas, typically steam, is delivered to the ring 62 for discharge through the nozzles 64. The stripping steam passes upwardly through the bed of particulate solids to remove impurities from the surface of the particulate solids. 1.0 to 3.0 pounds of steam at 200° F. to 500° F. temperature and 20 to 200 psig pressure are delivered to the stripper for each 0.5 ton of particulate solids. The stripping steam and entrained impurities pass upwardly through the particulate solids in the stripper 53 and discharge through a vent line (not shown) to the cracked gas line.

The stripped solids are accumulated in the control hopper 55 for eventual delivery to the entrained bed heater 58. The control hopper 55 is a collection vessel in which solids enter through the standpipe 66 and from which an outlet line 73 extends to deliver solids to the entrained bed heater 58. The assembly of the control hopper 55 and standpipe 66 provides for a slumped bed solids transport system as described in U.S. Pat. Nos. 4,459,071 and 4,453,865, which are incorporated herein by reference. The pressure differential maintained between the slumped bed surface 68 in the control hopper 55 and the exit 70 of the outlet line 73 determine the solids flow rate between the control hopper 55 and the entrained bed heater 58. A line 72 is provided to selectively introduce steam under pressure into the control hopper 55 to regulate the pressure differential. Probes 67 and 69 are placed respectively in the control hopper 55 and entrained bed heater 58 to monitor the pressure differential and regulate the valve 65 in the steam line 72.

The entrained bed heater 58 is essentially tubular in configuration. An array of distinct fuel nozzles 61 fed by fuel lines 63 are arranged essentially symmetrically on the lower inclined surface 75 of the entrained bed heater 58. Air under pressure enters the entrained bed heater 58 through a nozzle 77 arranged to direct the air axially upwardly through the entrained bed heater 58. The air jet provides both the motive force to lift the solids particles upwardly through the entrained bed heater 58 to the regenerated solids vessel 60 and the air necessary for combustion. The fuel is ignited by contact with the hot solids in the presence of air.

The combustion gas/solids mixture moving upwardly through lift line 57 enters the regenerated solids vessel 60 tangentially, preferably, perpendicular to the lift line to separate the combustion gases from the solids. As shown in FIG. 1, the vessel 60 has a distube 85 in the gas outlet nozzle 86 to provide cyclonic movement which improves the separation efficiency of the system.

In operation, the solids slide down the inside edge of the entrained bed heater 58 and are picked up by the central air jet which operates at a velocity of 80 to 150 feet per second. The superficial velocity in the main body of the entrained bed heater 58 is 8 to 15 feet per second. The reduction in velocity and the use of a single central jet creates a circulation in dilute phase within the expanded portion of the bed. The entrained solids fall to the side and are re-entrained in the jet. The velocities are such that there is a net transport of solids up the lift line 57 with the wide spot in the line creating a zone of recirculation and hence higher solid density and residence time. Practice a shows that the solids on the average recirculate about 10 to 15 times compared to the net throughput. The characteristics and advantages of the entrained bed heater 58 include a recirculation system that creates a higher solids density that minimizes peak temperatures that could damage catalysts or solid. In addition, the combustion in the entrained bed heater 58 occurs in the gas phase. The solids are suspended in the gas and thus the combustion is rapid and the gas and fuel are intimately mixed in the combustion zone.

The combustion reaction in the entrained bed heater includes the coke coating the particulate solids. Thus, the feed to air ratio is maintained for a nominal 10% excess of air over fuel and insures that all the coke on the particulate solids is burned and contributes to the solids heating process. The reaction is of a type similar to $CH_x + O_2 \ H_2O + CO_2$.

The regenerated solids-vessel 60 is a cylindrical vessel provided with a standpipe 71, seen in FIG. 2, extending to the reactor hopper 31. Again the structure of the regenerated solids vessel 60 provides for accumulation of a slumped bed 81, seen in FIG. 9 above which pressure can be regulated to enable controlled delivery of the regenerated particulate solids to the reactor hopper 31.

The upper solids collection vessel 60 seen in FIGS. 1, 2 and 9 contains a stripping section as the lower portion with a stripping ring 79 and forms a part of the solids deliver system 10. Above ring 79, the solids are fluidized; below the ring 79 the solids slump and are fed to the standpipe 71. The standpipe 71 feeds the slumped bed in the control hopper 31 as best seen in FIG. 2. Solids flow into the reactor hopper 31 through the standpipe 71 to replace solids that have flowed into the reactor 4. Unearated solids (slumped solids) will not continue to flow into the reactor hopper 31 once the entrance 82 to the hopper 31 has been covered. Thus the position of the entry 82 defines the solids level in hopper 31. As solids flow from hopper 31 via pressure differential between the vapor space in the chamber 91 above the bed 18 and the mixture zone 11, the entry 82 is uncovered allowing additional solids to flow into the hopper 31.

The solids flow from the rectangular orifices or solids inlet passages 19 is what can be described as extrusion flow. The solids are in dense phase until picked up by the pre-acceleration gas. A pressure drop of 0.5 to 5.0 psi is used to control the rate of solids flow to the reactor mixing section 11.

The process of the invention proceeds by delivering pre-acceleration gas feed such as steam at a temperature of 400° to 1100° F. through the pre-acceleration inlets and hydrocarbon feed at a temperature of 300° to 1100° F. such as, LPG, naphtha, gas oil, or resid through the feed nozzles 28 to the reactor 4. The hot particulate solids are delivered to the reactor 4 through the rectangular orifices at a temperature of 1200° to 1700° F. The hydrocarbon feed mixes with the hot particulate solids and is cracked at a cracking temperature of 1100° to 1500° F. The pressure in the reactor is 6 to 60 psi and the residence time or contact time from hydrocarbon feed entry to quenched cracked gas effluent is 0.1 to 0.6 seconds. The hot particulate solids are cooled from a temperature of 1200° to 1700° F. to 1100° to 1500° F. and spend 0.1 to 0.6 seconds from passage through the rectangular orifice to discharge from the separator solids outlet.

The cracked gases are quenched by direct quench oil in the cyclone to 1000° to 1200° F. degrees. Thereafter, additional quench cooling is performed to reduce the cracked effluent temperature to 300° to 700° F. for fractionation.

The solids are stripped of surface impurities in the stripper by steam at temperatures of 1100° to 1500° F. The stripped particulate solids are then delivered to the entrained bed heater at a temperature of 1100° to 1500° F. Fuel having a BTU content of 17,000–22,000 BTU/LB and 12 to 17 pounds of air per pound of fuel and coke are continuously fed to the entrained bed heater and combusted with the coke (carbon) on the particulate solids at temperatures of 1200° to 1700° F. and a pressure of 6 to 60 psi. Hot particulate solids are delivered to the regenerated solids vessel at a temperature of 1200° to 1700° F. where the combustion gases are separated in the separator and cyclones and exhausted as flue gas. The flue gas has no BTU content and is used to preheat feedstock or generate steam.

The hot solids are returned to the reactor 4 through the reactor hopper and rectangular orifices at a temperature of 1200° to 1500° F.

A projected material balance is as follows:
— naphtha feed 50,000 lb/hr secondary feed only
— dilution steam 1600 lb/hr 3000 lb/hr primary 13000 lb/hr secondary
— solid circulation 850,000 lb/hr
— naphtha preheat temp 900° F.
— dilution steam preheat temp 1100° F.
— reactor outlet temperature 1340° F.
— solid inlet temperature 1590° F.
— air flow 75000 lb/hr preheated to 700° F. (by flue gas)
— fuel required
  coke on solid from reaction 250 lb/hr (3.9 MMBTU/hr)
  external fuel 4670 lb/hr (77 MMBTU/hr)

In practice it has been found that the particulate solids loss is 0.005% of circulation in the practice of the present invention.

The yield from the 50,000 lb/hr of naphtha is as follows:

| Product | Yield (Weight %) |
| --- | --- |
| H2 | 0.67 |
| CH4 | 13.05 |
| C2H2 | 0.39 |
| C2H4 | 27.47 |
| C2H6 | 3.52 |
| C3H4 | 0.51 |
| C3H6 | 15.01 |
| C3H8 | 0.49 |
| C4H6 | 3.82 |
| O—C4's | 4.58 |
| C5's | 5.08 |
| Benzene | 5.09 |
| Toulene | 3.98 |
| EB + X | 3.17 |
| Styrene | 1.02 |
| O—C6 | 2.05 |
| O—C7 | 2.45 |
| O—C8 | 1.34 |
| C9-400° F. | 2.72 |
| LFO | 3.05 |
| HFO | 0.05 |
| Coke | 0.49 |

We claim:
1. A catalytic cracking unit, comprising:
a catalytic cracker comprising a catalytic cracking reactor for catalytically cracking feed oil comprising gas oil in the presence of a cracking catalyst to produce a stream of catalytically cracked oil containing particulates of coked cracking catalyst, an oil feed line communicating with said catalytic cracking reactor for feeding said feed oil to said catalytic cracking reactor, and a regenerated catalyst line communicating with said catalytic crack- ing reactor for conveying regenerated cracking catalyst to said catalytic cracking reactor, a separator comprising a separating vessel communicating with said catalytic cracking reactor for substantially disengaging said particulates of coked cracking catalyst from said catalytically cracked oil;

an internal rough cut separator positioned inside said separating vessel for making a rough cut separation of said coked cracking catalyst particulates from said catalytically cracked oil, said internal rough cut separator having a product outlet for egress of catalytically cracked oil;

an oil quench injector extending into said separating vessel for inhibiting substantial thermal cracking of said catalytically cracked oil;

at least one secondary internal cyclone positioned inside said separating vessel and having an inlet at an elevation above said rough cut separator; and said oil quench injector comprises an oil quench line disposed at said inlet of said secondary cyclone.

* * * * *